United States Patent [19]

Hirt et al.

[11] Patent Number: 4,979,587

[45] Date of Patent: Dec. 25, 1990

[54] JET ENGINE NOISE SUPPRESSOR

[75] Inventors: William J. Hirt, Bellevue; Jack H. Caldwell, Kent; Claude R. Stachowiak, Renton; Ira B. Rushwald; Henry A. Kumasaka, both of Seattle, all of Wash.

[73] Assignee: The Boeing Company, Seattle, Wash.

[21] Appl. No.: 388,246

[22] Filed: Aug. 1, 1989

[51] Int. Cl.$^5$ ............................. F01N 1/08; F02K 1/00
[52] U.S. Cl. ............................. 181/213; 181/264; 181/269; 181/273; 181/296; 244/1 N
[58] Field of Search ............... 181/213, 215, 216, 217, 181/218, 262, 264, 239, 240, 256, 273, 296, 269; 244/1 N

[56] References Cited

U.S. PATENT DOCUMENTS

| | | | |
|---|---|---|---|
| 700,785 | 5/1902 | Kull | 181/239 |
| 1,697,794 | 1/1929 | Stranahan | 181/240 |
| 1,794,276 | 1/1931 | Bowes | 181/262 |
| 2,103,466 | 12/1937 | Klemm et al. | 244/53 R |
| 2,274,461 | 2/1942 | Rauen | 181/273 |
| 2,926,744 | 3/1960 | Towle et al. | |
| 2,979,151 | 4/1961 | Blackwell et al. | 181/217 |
| 3,119,459 | 1/1964 | Ludlow et al. | 181/227 |
| 3,174,581 | 3/1965 | Duthion et al. | 181/217 |
| 3,196,977 | 7/1965 | Sanders | 181/256 |
| 3,227,240 | 1/1966 | Lee et al. | 181/218 |
| 3,338,331 | 8/1967 | Jettinghoff | 181/227 |
| 3,398,881 | 8/1968 | Greenberg et al. | |
| 3,493,169 | 2/1970 | Abild et al. | |
| 3,632,223 | 1/1972 | Hampton | 415/144 |
| 3,692,140 | 9/1972 | Smith | 181/213 |
| 3,777,489 | 12/1973 | Johnson et al. | 60/226.1 |
| 3,945,759 | 3/1976 | Bobo | 415/145 |
| 3,951,566 | 4/1976 | Mattei et al. | 415/115 |
| 4,022,112 | 5/1977 | Putt et al. | 91/376 R |
| 4,128,769 | 12/1978 | Bons et al. | 290/52 |
| 4,132,285 | 1/1979 | Milde et al. | 181/258 |
| 4,156,344 | 5/1979 | Cuthbertson et al. | 60/226.1 |
| 4,244,440 | 1/1981 | Matta et al. | 181/213 |
| 4,244,441 | 1/1981 | Tolman | 181/217 |
| 4,610,326 | 9/1986 | Kirchweger et al. | 180/68.1 |
| 4,685,533 | 8/1987 | Pieski | 181/213 |

Primary Examiner—Benjamin R. Fuller
Attorney, Agent, or Firm—Joan H. Pauly; Delbert J. Barnard; Bruce A. Kaser

[57] ABSTRACT

A compressor bleed air passageway includes a duct having an upstream section (48) which terminates in a baffle (44) and a downstream duct section (54) having a forward portion (56) which surrounds the baffle (44). Bleed air flow through openings (58) in the baffle wall (52). This reduces velocity of the bleed air stream at the duct discharge port to a value equal to or less than Mach 1.0. The baffle (44) has virtually no effect on a low-velocity, low-pressure air stream. The downstream duct section (54) may be perforated and surrounded by outer wall (64) to form sound-absorbing chambers (66).

9 Claims, 5 Drawing Sheets

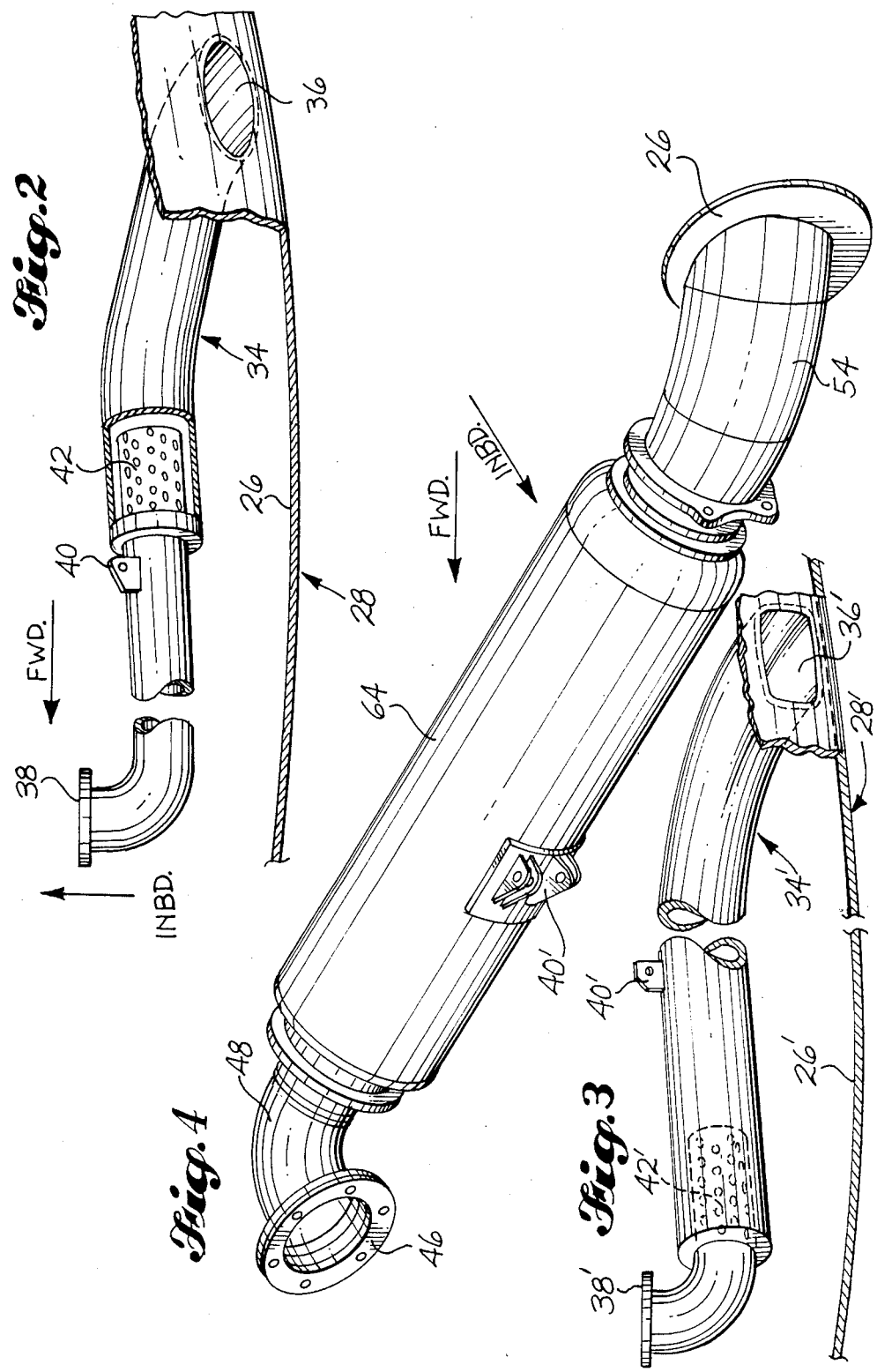

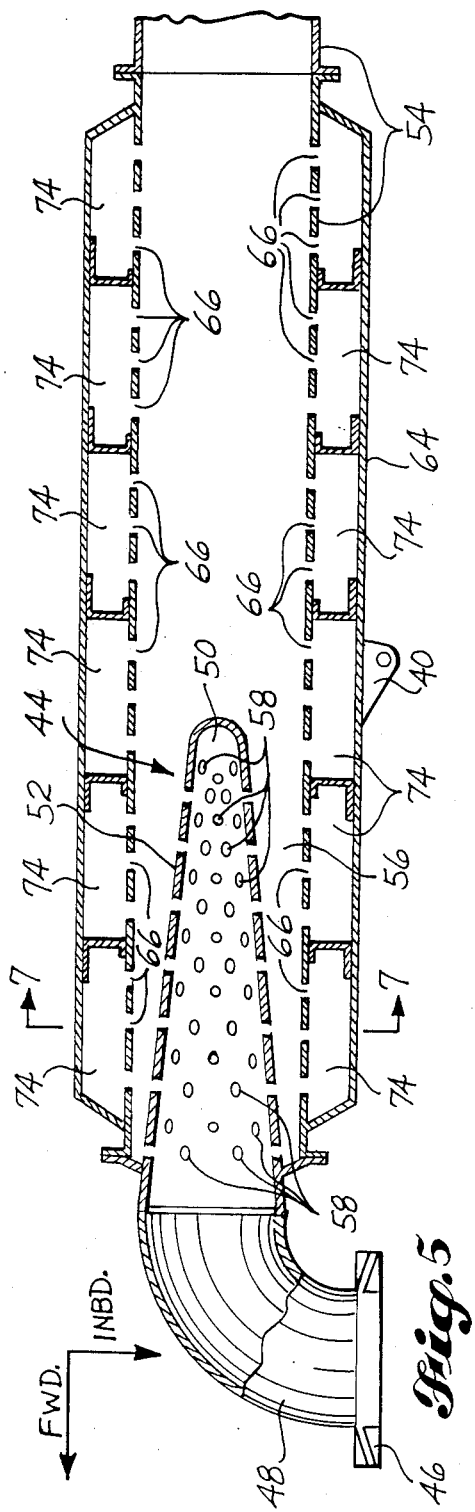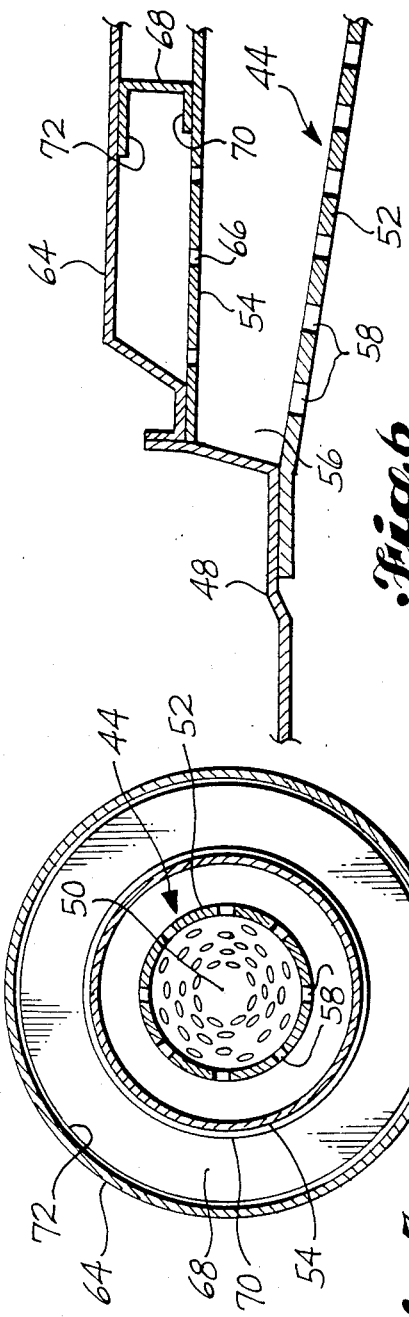

JET ENGINE NOISE SUPPRESSOR

TECHNICAL FIELD

This invention relates to reducing noise emitted from jet engines. More particularly, it relates to reducing noise generated by the discharge of compressor bleed air into the atmosphere.

BACKGROUND INFORMATION

It is known that the compressor of an aircraft turbine engine may "stall" under certain conditions. It is also known that bleeding high-pressure air from the compressor can increase the compressor's range of stable operation, averting the onset of compressor stall and/or aiding in recovery from compressor stall. Such a stability bleed system is typically provided by a bleed port at a desired compressor stage and a bleed duct leading from the bleed port to an exit opening discharging into the engine fan stream downstream of the fan nozzle.

A problem with known stability bleed systems is that substantial noise is generated where the stream of bleed air discharges into the fan stream. The principal object of the present invention is to provide an effective noise suppressor for a stability bleed air duct. It is also an object of the invention to provide such a noise suppressor which does not create significant back pressure during low power operation of the engine.

The prior art shows compressor bleed ducts with gradually increasing cross-sectional areas to diffuse the air flow and reduce noise. The problem with these systems is that stability bleed air often has a pressure such that the velocity at the outlet is supersonic. Increasing the cross-sectional area of a duct carrying such an air stream may actually cause an increase in generated noise.

DISCLOSURE OF THE INVENTION

Basically considered, the present invention comprises an apparatus including a passageway or duct having an inlet end portion and a discharge port. A baffle is positioned within the passageway and the baffle has pressure-reducing openings or perforations sized and arranged to reduce the pressure of high-pressure gas so that the flow is subsonic at the discharge port. In preferred form, the pressure-reducing openings are also sized and arranged so that low-pressure gas encounters minimum flow resistance. By way of example, the baffle may be substantially cylindrical or substantially conical.

As used herein, "high pressure" gas or air means gas or air with a pressure sufficiently high such that, without the baffle of the invention, the velocity of the gas or air at the discharge port would be greater than Mach 1.0; and "low pressure" gas or air means gas or air with a pressure lower than "high pressure" gas or air, which low pressure is characteristic of the starting conditions of the engine. The exact values for these pressures vary with the design of the particular engine.

The present invention further comprises a method of positioning such a baffle within the passageway to reduce the flow velocity at the discharge port to subsonic conditions so that the cross-sectional area of the discharge may be increased without increasing noise in the vicinity of the discharge port. In preferred form, the size of the discharge outlet port is then substantially increased.

The passageway may be provided with a sound-absorbing lining downstream from the baffle. The lined passageway may comprise a perforate inner wall and a solid or imperforate outer wall concentrically surrounding the inner wall. An annular sound-absorbing chamber or chambers is defined by and between the two walls and the perforations communicate the interior of the downstream passageway with the chamber or chambers.

The objects, features and advantages of the invention are hereinafter set forth in, or are evident from, the description of the best modes.

BRIEF DESCRIPTION OF THE DRAWINGS

Like reference numerals are used to designate like parts throughout the several views of the drawing, and:

FIG. 2 is a view of a stability bleed duct embodying the invention, partially cut away to reveal its pressure reducing baffle;

FIG. 3 is a view similar to FIG. 2 showing a second embodiment of the invention;

FIG. 4 is a pictorial view of a third embodiment of the invention;

FIG. 5 is a longitudinal sectional view of the duct shown by FIG. 4, with the downstream end omitted;

FIG. 6 is an enlarged view of a portion of FIG. 5;

FIG. 7 is a cross-sectional view of the duct shown by FIGS. 4 and 5, taken substantially along line 7—7 of FIG. 5;

BEST MODE FOR CARRYING OUT THE INVENTION

Figure 1:
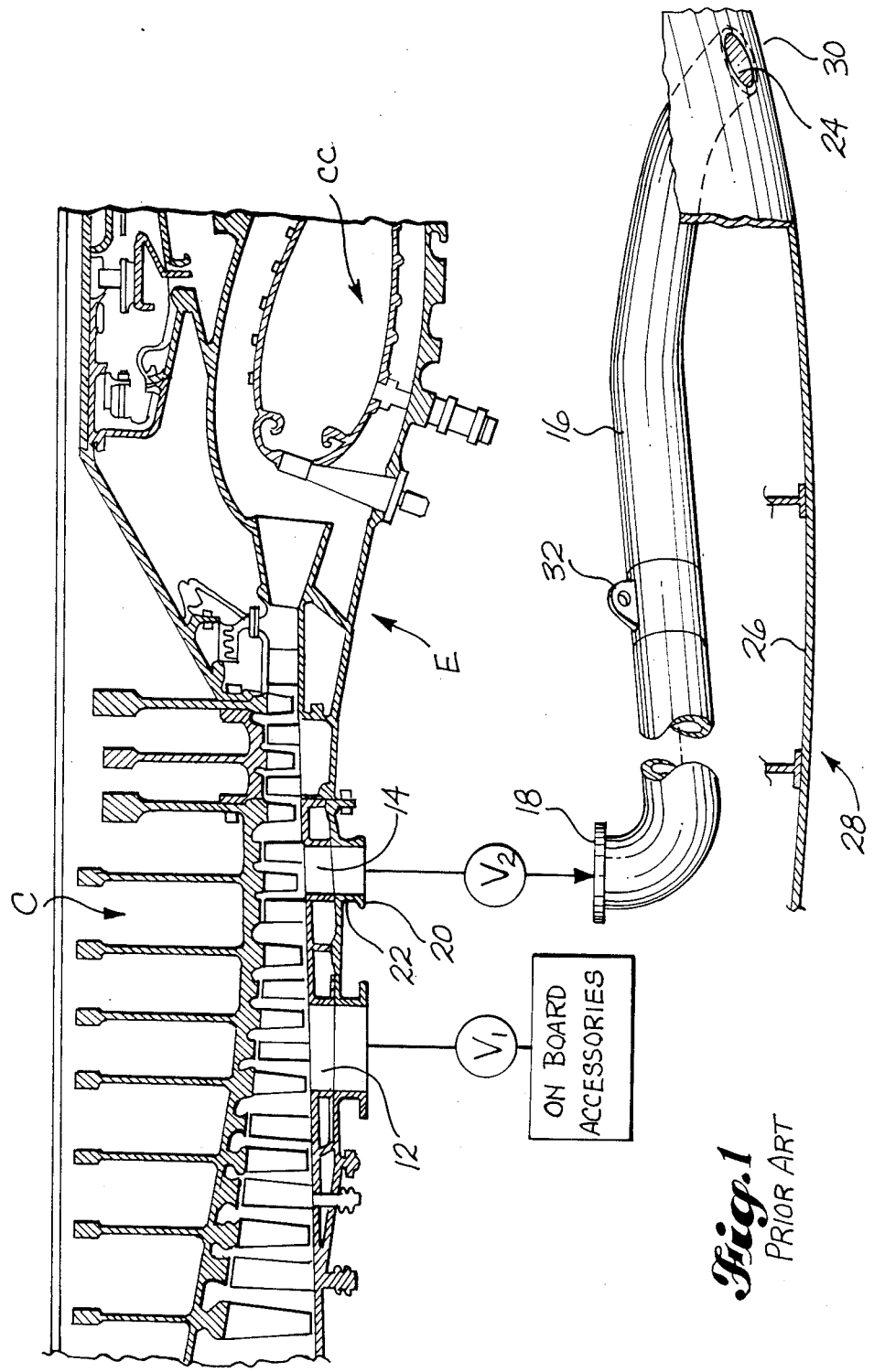
FIG. 1 is a system diagram showing a prior art stability bleed duct or passageway and its relationship to a typical compressor stability bleed port, with the bleed duct shown in an enlarged scale.

Referring now to the drawing, in FIG. 1 is shown a sectional side view of a portion of a jet aircraft turbine engine E. The compressor section is shown at C, and the combustion chamber section is shown at CC. A bleed port to provide air for the operation of aircraft accessories is shown at 12. Further downstream is the compressor stability bleed port 14. By way of example, in the Pratt & Whitney 2000 Series engines, as used on the Boeing 757, port 12 is at the tenth stage of the compressor C and port 14 is at the fourteenth stage of the compressor C.

A controllable on/off valve $V_2$ is installed in a bleed air passageway leading from and including port 14. Valve $V_2$ is upstream of a duct which is a major part of the passageway. The bleed valve $V_2$ opens automatically under "critical stability" conditions, i.e. when the compressor might surge or stall. It may also be opened by command for engine starting. When valve $V_2$ is open, the quantity, velocity, and pressure of the bleed air from port 14 is completely determined by the operating conditions of the compressor C limited by the choke flow capacity of the valve $V_2$.

The duct 16 in FIG. 1 is an example prior art bleed air duct. The duct 16 at its inlet end has a mounting flange designed to mate with a similar mounting flange (not shown) on the valve $V_2$. Valve $V_2$ has a second flange (not shown) designed to mate with flange 20 at the end of a short duct 22 which leads from bleed port 14. The duct outlet 24 is flush with an opening in the skin 26 of the core cowl 28. The bleed air exhausts into the fan stream 30. The duct 16 also has at least one mounting ear 32 for attachment to a frame portion (not shown) of the engine E.

Generated noise is proportional to the velocity of the fully expanded air stream, so noise can be reduced by reducing that velocity. An air stream is "fully expanded" when its pressure is the same as the pressure of the surrounding air. The velocity of the air stream at the discharge outlet can be affected simply by changing the cross-sectional area of the passageway, particularly at the outlet, but the velocity at the outlet is not necessarily the fully expanded velocity because the air stream is not necessarily fully expanded at the outlet. An air stream that is not fully expanded at the outlet will continue to increase in velocity as it becomes fully expanded in the free atmosphere downstream from the outlet.

Manipulating the cross-sectional area of the passageway may or may not by itself beneficially affect the velocity of the fully expanded air stream. An important factor is the pressure in the passageway. If the pressure is such that the velocity at the outlet is below Mach 1.0, the air stream is fully expanded at the outlet. Increasing the cross-sectional area decreases the discharge velocity, which, in this case, is also the fully expanded velocity, and thereby decreases generated noise. If the pressure is such that the velocity at the outlet is above Mach 1.0, the air stream may or may not be fully expanded at the outlet, and increasing the cross-sectional area does not decrease the fully expanded velocity and may actually increase the fully expanded velocity. If the pressure is such that the velocity at the outlet is at Mach 1.0, the air stream may or may not be fully expanded, but increasing the cross-sectional area nevertheless decreases the fully expanded velocity, and thereby decreases generated noise. Therefore, to take advantage of the technique of manipulating the cross-sectional area of the passageway, it is necessary to use some other means to reduce the pressure of the air stream, regardless of the engine's operating conditions, so that the velocity will be equal to or less than Mach 1.0 at the discharge outlet.

Restricting the pressure of the air stream within the duct requires that the duct be provided with some kind of pressure loss device, e.g. a perforate baffle. Simply placing a baffle within the duct without careful consideration of its principles of operation, however, can create a new problem. It is desirable to completely "unload" the compressor C for engine starting. Therefore, any pressure loss device installed within the duct must not generate significant back pressure at low power engine operation.

The basic principle of operation of a baffle is that it impedes high-pressure air flow. If the pressure of air flow is sufficiently low, the baffle of the invention will have virtually no effect. As pressure increases, the baffle increasingly "chokes" the air flow. This choking effect causes pressure loss across the baffle.

The critical factor in the design of the invention baffle was the total area of the holes through which the air stream must pass. The greater the total hole area, the greater the air stream velocity and pressure may be before the choking effect begins. The total hole area was therefore chosen so that the choking effect of the baffle of the invention begins at an air stream velocity and pressure greater than that produced by engine starting conditions, i.e. so that the compressor C is completely "unloaded" for engine starting.

The total hole area could, at least theoretically, be provided by a single large hole. It is preferable however, to provide the total hole area by means of a multiplicity of smaller holes arranged regularly over the surface of the baffle so that air flow downstream from the baffle will be uniform. As long as the proper total hole area is maintained, the exact details of the number, size, and arrangement of these smaller holes are not significant as to the pressure at which choking begins. The size of the smaller holes does, however, affect the frequency range of noise downstream of the baffle. This consideration is discussed in more detail below.

FIGS. 2–10 show embodiments of the invention. Throughout the figures, the legend "FWD" refers to the forward orientation relative to the engine E, and the legend "INBD" refers to the inboard orientation relative to the engine E, i.e. toward the rotational axis of the compressor C.

FIG. 2 shows a bleed air duct 34 with an inlet end mounting flange 38 and at least one attachment ear 40, both as in the prior art duct 16. Duct 34 also has a baffle 42, and the portion of the duct 34 downstream from the baffle 42 is substantially larger in cross-sectional area than the prior art duct 16. The duct 34 terminates at a discharge outlet port 36 with a substantially larger area than outlet port 24 from the prior art duct 16. Thus, FIG. 2 illustrates the above-stated technique of manipulating the cross-sectional area of the passageway, particularly of the discharge port, as well as use of a baffle means to enable the technique.

FIG. 3 shows an embodiment like the embodiment of FIG. 2. The differences are that the baffle 42' is located near the upstream end of the duct 34', upstream of the attachment ear 40', and the discharge outlet 36' has an oblong shape.

The embodiment of FIGS. 4–10 includes a front end mounting flange 46 on an upstream duct section 48. As best shown by FIG. 5, duct section 48 includes the baffle 44. Baffle 44 includes a closed downstream end 50 and a sidewall 52 upstream of the closed end 50. The baffle portion 44 of upstream duct section 48 extends into a larger area upstream portion of a downstream duct section 54, such that upstream portion 56 of duct section 54 surrounds and is spaced radially outwardly from the baffle 44. The baffle sidewall 52 is formed to include a large number of ports or openings 58.

Referring to FIG. 5, the bleed air enters duct section 48 and flows downstream into baffle 44. It then flows through the openings 58, and into the downstream section 54. The openings 58 cause air velocity in the downstream duct section 54 to be subsonic under all operating conditions.

As the air pressure upstream of the baffle 44 may be very high, the baffle 44 clearly may be subjected to significant physical stresses. In fact, in some installations the closed end of a cylindrical baffle 42 or 42' might blow out under such stresses. The conical perforate baffle 44 is mechanically more stable than a cylindrical baffle 42 or 42' and does not suffer such failures. Furthermore, because of the small cross-sectional area at the downstream end 50 of the conical baffle 44, the end 50 could be left open, but this resulted in noise increase in tests. The conical baffle 44 is also somewhat more efficient than a cylindrical baffle 42 or 42' because it produces a more uniform distribution of air flow downstream from the baffle. This is because air flow through the sides of a cylindrical baffle 42 or 42' is radial only while air flow through the sides of a conical baffle 44 is axial as well as radial.

Figure 9:
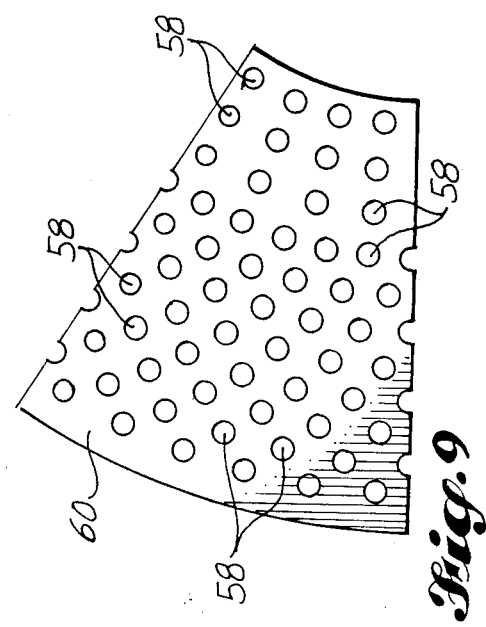
FIG. 9 is a plan view of a flat development of the baffle shown by FIG. 8, showing a pattern of the pressure-reducing openings.
Figure 8:
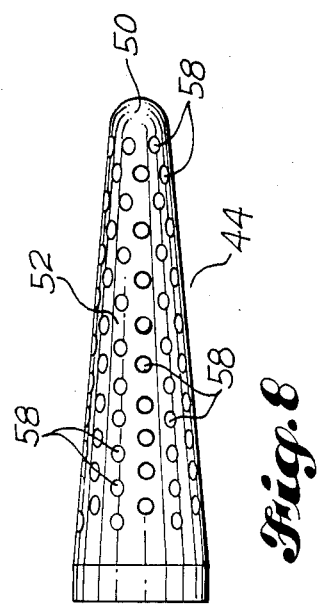
FIG. 8 is a side elevational view of a preferred embodiment of the pressure reducing baffle.
Figure 10:
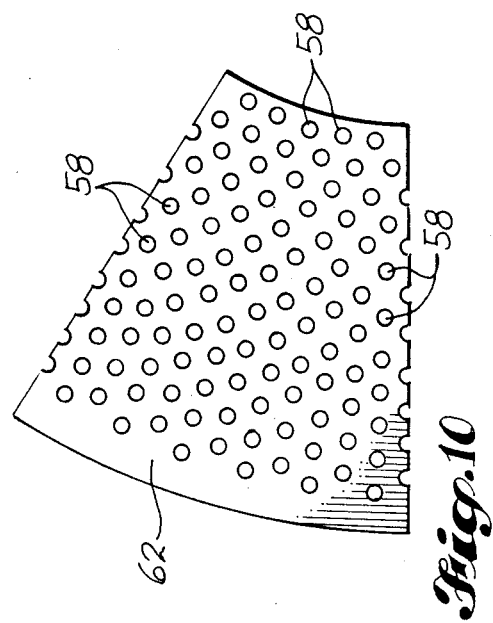
FIG. 10 is a view like FIG. 9, but showing a different pattern of the pressure-reducing openings.

The conical baffle 44 is also easier to manufacture than a cylindrical baffle. The conical baffle 44 may be formed from a piece of flat sheet metal by drilling or punching the holes 58 and then rolling, forming, and welding the piece into the conical shape shown in FIGS. 5 and 8. FIG. 9 shows an embodiment of the piece of flat sheet metal 60 from which the baffle 30 is formed. FIG. 10 shows another embodiment in which the sheet metal member is designated 62. The embodiment of FIG. 9 has 56 holes, each 0.625 in diameter, with four additional holes being created by forming and welding the piece 60. The embodiment of FIG. 10 has 99 holes, each 0.4375 in diameter, with eight additional holes being created by forming and welding the piece 62. Not shown is an embodiment like FIG. 10 with 114 holes each 0.4375 in diameter. In tests, the embodiment of FIG. 9 performed best.

The downstream duct section may be a simple, solid-walled passageway, but it preferably has a porous lining. In the preferred embodiment shown in FIGS. 4 and 5, the downstream duct section 54, 64 comprises an imperforate outer wall 64 surrounding a porous inner wall 54, which is perforated by openings 66 over the surface surrounded by wall 64.

The spacing between the outer wall 64 and the inner wall 54 may by way of example be maintained by annular support rings 68. Each support ring 68 is like a common washer but with axial flanges 70, 72 at its outer and inner circumferences (FIG. 6). Each support ring 68 is attached to the outer wall 64 at and by its flange 72, e.g. by welding. It is not known at the present whether or not it is preferable to rigidly attach the rings 68 to the duct wall 54. In the presently preferred embodiment, the inner flanges 70 of rings 68 are not attached to the inner wall 54 because of concerns about the possibility of metal fatigue.

The combination of the outer wall 64, the perforated inner wall 54, and the support rings 68 creates a multiplicity of sound-absorbing chambers 74. This is acoustically "softer" than a solid-walled passageway. That is, the combination aids in reducing the noise of the air stream, which, of course, is always subsonic in the area downstream of the baffle 44. The acoustic wall treatment could also comprise a honeycomb material or even a steel wool type of material. The important factor is to provide a porous surface that restricts or eliminates air flow along the upstream-downstream axis in the area of the acoustic wall treatment.

As indicated above, the frequency of the noise downstream of the baffle is influenced by the size of the individual holes in the baffle. This in turn influences the design of the acoustic lining. Therefore, as the design of the baffle and the design of the acoustic lining are interdependent, the description herein of the best mode of either of these elements assumes the use of the best mode of the other elements. For example, the paragraph above that describes the best mode baffle embodiment of FIG. 9 assumes the use of a best mode acoustic lining embodiment, the details of which are provided below.

The parameters to be determined in the design of the acoustic lining, in descending order of importance, are the percent of open area (i.e. the total area of the openings 66), the depth of the wall treatment (i.e. the distance between inner wall 54 and outer wall 64), the diameter of the individual openings 66, and the thickness of the inner wall 54. The factors that affect the design of the acoustic lining are the noise frequency, acoustic level, and air flow conditions, including velocity and temperature, within the downstream duct.

As previously stated, the single most important consideration is that the baffle is designed to reduce the pressure so that flow velocity at the discharge outlet is no greater than Mach 1.0. Secondarily, the size of the baffle openings 58 is selected to increase the frequency of the noise, which reduces the depth of the wall treatment necessary to attain a given level of noise attenuation, while not adversely affecting other characteristics of the air flow. The interrelationship between frequency and acoustic treatment under relatively moderate conditions is generally known by those skilled in the gas flow and acoustic arts. However, it has not been previously applied in the relatively severe range of conditions in which the bleed duct of the present invention operates. Such conditions include, for example, air flow downstream from the baffle 44 with a velocity close to Mach 1.0 and a temperature close to 1000° F.

In the illustrated preferred embodiment of the acoustic lining, the total area of the openings 66 comprises ten percent of the surface area of inner wall 54, the spacing between walls 54 and 64 is 1.25 inches, the diameter of each opening 66 is 0.063 inch, and the thickness of inner wall 54 is 0.024 inch. Ideally, the space between the walls 54 and 64 would be filled with a honeycomb material, but this was not possible because of the rather tight radius of curvature of the walls. The annular support rings 68 were therefore provided instead. The preferred spacing between the support rings 68 depends on the wave length, and therefore the frequency, of the noise. In the environment of the PW 2000 Series engine, the spacing is preferably 4.4 inches.

As the area of the downstream passageway and outlet is increased, the pressure and velocity of the subsonic air stream is decreased, and generated noise is thus decreased. Narrowing the outlet increases the pressure and velocity of the air stream at the outlet and thus increases the generated noise, but also increases the back pressure in the downstream duct section and thus makes the acoustic wall treatment more effective, which reduces generated noise. This is an engineering trade-off type of situation in which the optimum trade-off point, i.e. outlet narrowing, is best determined empirically. In the PW 2000 Series environment, the trade-off does not seem to work beneficially and the outlet is not narrowed at all. The outlet has an oblong shape, as in the embodiment shown in FIG. 3.

Figure 11:
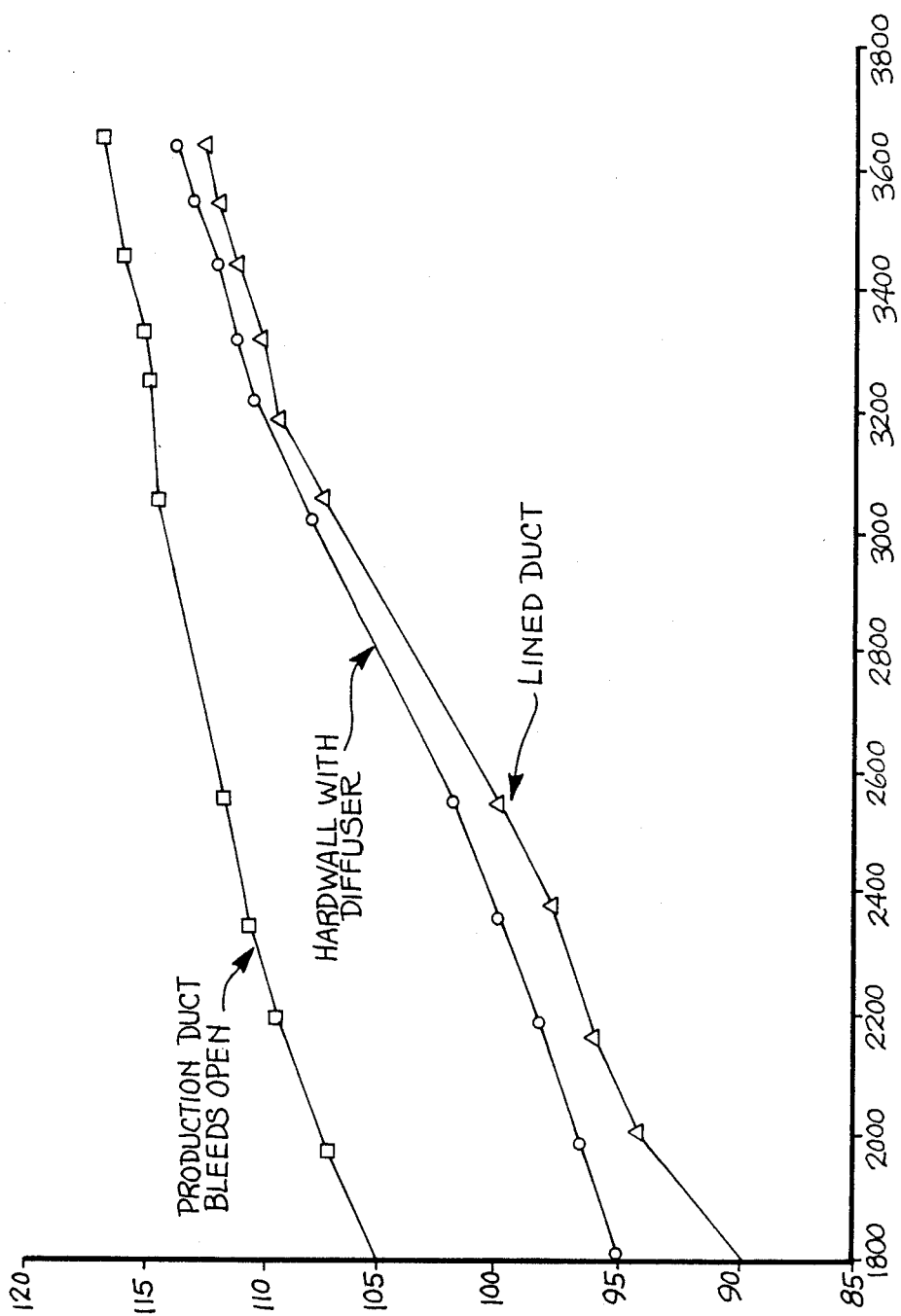
FIG. 11 is a graph plotting noise level versus compressor rotational speed.

FIG. 11 is a graphical representation of the results of actual tests. The horizontal axis represents the RPM of the compressor. The vertical axis represents the noise generated by the bleed air. The curve labeled "Hardwall with Diffuser" is directed to a duct embodying the invention but with a conical baffle and a simple, solid-walled downstream section. The curve labeled "Lined Duct" is directed to the preferred embodiment which includes the sound-absorbing chambers. The remaining curve is directed to the prior art duct. All of the curves, of course, show that generated noise increases as the RPM of the compressor increases. The relationship between the curves shows that generated noise is dramatically reduced by use of the invention.

The illustrated embodiments are presented by way of examples of forms which the invention can take. It is to be understood that the invention is not to be limited to these examples but rather is to be determined by the claims which follow interpreted in accordance with the established rules of patent claim interpretation, including use of the doctrine of equivalents.

What is claimed is:

1. In a system for bleeding air from a compressor of an aircraft engine to maintain compressor stability, said system including a flow passageway having an inlet end portion communicating with the engine and a discharge port communicating to atmosphere, an improvement for suppressing noise generated by supersonic exhause air from said discharge port, said improvement comprising:

a baffle positioned in the passageway and having openings through which exhaust gas passes when moving through the passageway from said inlet end portion to the discharge port; said openings having a total opening area sufficiently small to reduce in pressure high pressure gas passing therethrough an amount sufficient to ensure that such high pressure gas has at the discharge port a Mach number no greater than Mach 1.0, and sufficiently large to ensure that flow resistance to low pressure gas passing therethrough is sufficiently low to at least substantially prevent back pressure on the engine; and an enlarged discharge port to reduce noise.

2. The apparatus of claim 1, wherein said passageway includes a porous sound-absorbing lining on an interior surface of the passageway downsteam from the baffle.

3. The apparatus of claim 1, wherein the baffle is substantially cylindrical in shape.

4. The apparatus of claim 1, wherein the baffle is substantially conical in shape.

5. The apparatus of claim 2, wherein said sound-absorbing lining comprises a perforate inner wall spaced a radial distance from and enclosed by said interior surface, said inner wall and interior surface forming an annular space therebetween.

6. The apparatus of claim 5, wherein the baffle openings are sized to produce an increase in frequency of the noise downstream from the baffle to permit decreasing the radial distance between the inner wall and the interior surface without decreasing attenuation of the noise by the sound-absorbing lining.

7. A method for suppressing noise generated by supersonic exhaust gas from an aircraft engine, where said exhaust gas flows downstream through a passageway having an inlet end portion and a discharge port, said method comprising the steps of:

positioning within said passageway a baffle having openings with a total opening area sufficiently small to ensure that gas flow at the discharge port has a Mach number no greater than Mach 1.0, so that a cross-sectional area of the discharge port may be enlarged without increasing noise in a vicinity of the discharge port, and sufficiently large to ensure that flow resistance to low pressure gas passing through the openings is sufficiently low to at least substantially prevent back pressure on the engine; and enlarging the discharge port to reduce noise.

8. The method of claim 7, wherein the baffle is substantially conical in shape.

9. The method of claim 7, further comprising the steps of: positioning within the passageway a porous sound-absorbing lining on an interior surface of the passageway downstream from the baffle, said lining comprising a perforate inner wall spaced radially inwardly from and enclosed by the interior surface; and sizing the baffle openings to produce an increase in frequency of the noise downstream from the baffle to help maximize attenuation of noise by the sound-absorbing lining.

* * * * *

UNITED STATES PATENT AND TRADEMARK OFFICE
CERTIFICATE OF CORRECTION

PATENT NO. : 4,979,587
DATED : December 25, 1990
INVENTOR(S) : William J. Hirt et al.

It is certified that error appears in the above-identified patent and that said Letters Patent is hereby corrected as shown below:

Title Page:
In the Abstract, the 5th line, "flow" should be -- flows --.

Claim 1, column 7, line 14, "exhause" should be -- exhaust --.

Signed and Sealed this

Ninth Day of June, 1992

Attest:

DOUGLAS B. COMER

Attesting Officer

Acting Commissioner of Patents and Trademarks